3,646,232
POLYCYCLIC DIENES
Richard Gregory Foster and Paul Hepworth, Runcorn,
England, assignors to Imperial Chemical Industries
Limited, London, England
No Drawing. Filed July 20, 1970, Ser. No. 56,665
Claims priority, application Great Britain, July 22, 1969,
36,827/69
Int. Cl. C07c 13/28
U.S. Cl. 260—666 PY
11 Claims

ABSTRACT OF THE DISCLOSURE

A polycyclic diene having the structure

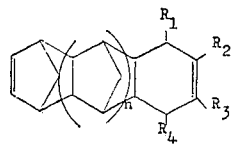

where $n$ is a whole number of at least one and each of $R_1$, $R_2$, $R_3$ and $R_4$ is either a hydrogen atom or a monovalent hydrocarbyl group, preferably an alkyl group, or derivatives thereof in which one or more of the carbon atoms in or forming part of the endomethylene bridged rings and not forming part of a carbon-carbon double bond carries a monovalent hydrocarbyl substituent group and a process for the preparation of the polycyclic diene by Diels-Alder reaction.

---

This invention relates to novel polycyclic dienes and to their synthesis.

It is known that valuable vulcanisable polymers may be produced by copolymerising ethylene with at least one other α-olefin and a non-conjugated diene. The novel polycyclic dienes of this invention are particularly suitable for use in the production of such vulcanisable polymers as the unsaturated bonds are non-conjugated and the dienes are readily copolymerisable with ethylene and an α-olefin to yield polymeric products which may be vulcanised to elastomers having good tensile properties.

According to the present invention we provide a polycyclic diene having the structure:

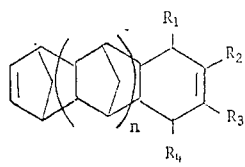

(I)

where $n$ is a whole number of at least one and each of $R_1$, $R_2$, $R_3$ and $R_4$ is either a hydrogen atom or a monovalent hydrocarbyl group, or derivatives thereof in which one or more of the carbon atoms in or forming part of the endomethylene bridged rings and not forming part of a carbon-carbon double bond carries a monovalent hydrocarbyl substituent group. Preferably the carbon atoms in or forming part of the endomethylene bridged rings are unsubstituted.

Where any of the groups $R_1$, $R_2$, $R_3$ and $R_4$ is a hydrocarbyl group it may be an alkyl, aryl, cycloalkyl, aralkyl or alkaryl group. It is to be understood that the term alk(yl) also includes cycloalk(yl). Examples of suitable hydrocarbyl groups include alkyl groups, for exampe, akyl groups having from 1 to 8 carbon atoms, e.g. methyl, ethyl, propyl, and butyl. Other suitable hydrocarbyl groups include, for example, phenyl, tolyl, benzyl and cyclohexyl.

On account of the relative ease of preparation of the dienes it is preferred that $n$ is a whole number of from 1 to 3, preferably 1.

Because of their highly useful copolymerisation activity with ethylene and α-olefins without premature cross-linking and the relatively rapid rate at which the polymeric products thereby obtained may be vulcanised, the preferred dienes of our invention are those in which at least one of the groups $R_2$ and $R_3$ in the structure I above is a hydrocarbyl group. In this case the nature of the groups $R_1$ and $R_4$ is not critical; they may each be a hydrogen atom or at least one may be a hydrocarbyl group.

Because of the ready availability of the starting materials for the preparation of the polycyclic dienes it is preferred that one of the groups $R_2$ and $R_3$ is an alkyl group and the other is a hydrogen atom and $R_1$ and $R_4$ are hydrogen atoms, or both $R_2$ and $R_3$ are alkyl groups and $R_1$ and $R_4$ are hydrogen atoms. Further polycyclic dienes which may be mentioned are those in which one of $R_1$ and $R_4$ is an alkyl group and the other is a hydrogen atom and $R_1$ and $R_4$ are hydrogen atoms, or all of the groups $R_1$ to $R_4$ are hydrogen atoms. Suitably the alkyl group may be a methyl group.

The polycyclic dienes of our invention may be prepared by effecting Diels-Alder reaction between a substituted polycyclic monoene of the structure:

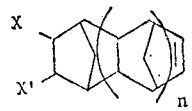

(II)

where $n$ is a whole number of at least one, or a hydrocarbyl substituted derivative thereof, and an acyclic conjugated diene having the structure:

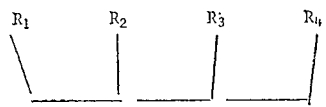

(III)

to form an intermediate having the structure

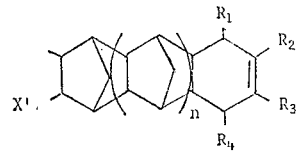

(IV)

and subsequently eliminating XX′ from the intermediate, where X and X′ are atoms or groups which may be eliminated from the intermediate with the formation of a double bond between the carbon atoms to which X and X′ were attached.

The substituted polycyclic monoene may be prepared by Diels-Alder Reaction of cyclopentadiene with either an olefin of the structure $$XCH=CHX'$$ (V)

or with a substituted norbornene having the structure

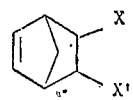

(V)

It will be appreciated that the substituted norbornene is the 1:1 molar adduct of cyclopentadiene and the olefin. The value of $n$ in the substituted polycyclic monoene will be determined by the relative proportions of cyclopentadiene and substituted norbornene or olefin used in the preparation, the use of greater proportions of cyclopentadiene favouring the production of substituted polycyclic monoenes having higher values of $n$. We have found that where a high proportion of substituted polycyclic monoene is desired in which $n$ is 1, a molar proportion of cyclopentadiene to the substituted norbornene in the range 0.75:1 to 1.25:1 or a molar proportion of cyclopentadiene to the olefin in the range 1.75:1 to 2.25:1 is suitable.

Mixtures of substituted polycyclic monoenes having different values of $n$ may be formed. If desired they may be separated, for example by distillation, or they may be used in further reaction without separation and, if desired, separated at a later stage in the process.

We have also found that reaction of cyclopentadiene with the olefin to produce the substituted polycyclic monoene may also result in the production of substantial amounts of the substituted norbornene. Moreover, reaction of cyclopentadiene with the substituted norbornene may produce a reaction product which contains substantial amounts of unreacted substituted norbornene in addition to the substituted polycyclic monoene. If desired, the substituted polycyclic monoene may be separated from the substituted norbornene, for example by distillation, before use in the further stages of our process. However, by using the mixture of substituted polycyclic monoene and the substituted norbornene in the further stages of our process a mixture of polycyclic dienes of structure I in which $n$ is a whole number of at least one and $n$ is also zero may be produced. This mixture of polycyclic dienes may also be used in the production of vulcanisable olefin copolymers and according to a further embodiment of our invention we provide a mixture of polycyclic dienes comprising (i) from 1% to 99% by weight of at least one polycyclic diene having the structure

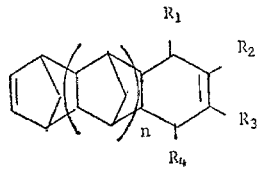

(VI)

where $n$ is a whole number of at least one and each of $R_1$, $R_2$, $R_3$ and $R_4$ is either a hydrogen atom or a monovalent hydrocarbyl group and (ii) 99% to 1% by weight of a polycyclic diene of structure I in which $n$ is zero, or derivatives of said polycyclic dienes in which one or more of the carbon atoms in or forming part of the endomethylene bridged rings and not forming part of a carbon-carbon double bond carries a monovalent hydrocarbyl substituent group. Preferably the carbon atoms in or forming part of the endomethylene bridged rings are unsubstituted. Suitably the mixture of polycyclic dienes may comprise from 10% to 90% by weight of (i) and from 90% to 10% by weight of (ii).

The reaction of cyclopentadiene with the substituted norbornene or olefin is preferably effected at elevated temperature and pressure, for example in an autoclave, preferably in the absence of air or moisture, e.g. in the presence of an inert gas, e.g. nitrogen. Inert diluents may be present if desired. Suitably temperatures in the range 50° C. to 300° C. and pressures up to 100 atmospheres may be used. Reaction times of from 5 minutes to 30 hours are suitable, although shorter or longer times may be used if desired. Temperatures in the range 150° C. to 250° C. are preferred, suitably under the autogenous pressure of the reactants.

Diels-Alder reaction of the substituted polycyclic monoene with the acyclic conjugated diene to form the intermediate may be effected at elevated temperature and pressure preferably in the absence of air and moisture, for example, in the presence of an inert gas, e.g. nitrogen. Inert diluents may be present if desired. Suitably temperatures in the range 50° to 300° C. and pressures up to 100 atmospheres may be used. Temperatures in the range 150° C. to 250° C. suitably under the autogenous pressure of the reactants are preferred. Reaction times of from 5 minutes to 30 hours may be suitable, although shorter or longer times may be used. Reaction may be effected in the presence of an excess of one of the reactants and it is particularly preferred to effect the reaction in the presence of an excess of the substituted polycyclic monoene if the by-production of large concentrations of dimers of the acyclic conjugated diene is to be minimised. Suitably the molar proportion of substituted polycyclic monoene to acyclic conjugated diene may be in the range 2:1 to 5:1.

For the reasons given above in respect of the polycyclic diene of structure I, it is, of course, preferred that at least one of the groups $R_2$ and $R_3$ in the acyclic conjugated diene is a hydrocarbyl group. In this case the nature of the groups $R_1$ and $R_4$ is not critical, they may each be hydrogen atoms, or at least one may be a hydrocarbyl group. Suitably at least one of the groups $R_2$ and $R_3$ in the acyclic conjugated diene is an alkyl group, e.g. methyl group. Because of their readily availability, the preferred acyclic conjugated dienes are isoprene and 2,3-dimethyl butadiene. Piperylene and butadiene may also be used.

The nature of X and X' is such that the compound XX' may be eliminated from the intermediate with the formation of a double bond between the carbon atoms to which X and X' were attached. For example, one of X and X' may be hydrogen and the other may be hydrogen or an ester group derived from a lower alkanoic acid containing, for example, up to six carbon atoms. Preferably at least one of X and X' is hydrogen and the other is a halogen atom, e.g. chlorine, i.e. the olefin is preferably a vinyl halide e.g. vinyl chloride.

The elimination of XX' from the intermediate compound may be effected in a number of ways; for example pyrolytically, catalytically, electrolytically or by chemical reaction, the method chosen depending on the nature of the group X and X'. For example, where one of X and X' is hydrogen and the other is halogen, e.g. chlorine, XX' may be eliminated by reaction with a base. Suitable bases include for example alkali metal alkoxides, for example, a potassium alkoxide or a sodium alkoxide, e.g. potassium tertiary butoxide or sodium tertiary butoxide. The reaction of the intermediate with the base is preferably effected at elevated temperature, if desired, in the presence of an inert diluent, for example at the reflux temperature of the inert diluent. Alternatively, the reaction may be effected in a sealed pressure vessel, if desired in the presence of an inert diluent and preferably at a temperature in the range 150° C. to 250° C.

It will be appreciated that in the Diels-Alder reactions described herein dicyclopentadiene may be used in place of cyclopentadiene provided the temperature of reaction is above the temperature at which dicyclopentadiene dissociates to cyclopentadiene at a rate which is faster than the reverse reaction, and also that in order to prepare derivatives of the polycyclic dienes of structure I in which one or more of the carbon atoms in or forming part of the endomethylene bridged rings and not forming part of a carbon-carbon double bond carries a monovalent hydrocarbyl group it will be necessary to use an appropriately hydrocarbyl-substituted cyclopentadiene in the preparation of the substituted polycyclic monoene for use in the process of our invention.

The invention is now illustrated by the following examples in which all parts are expressed as parts by weight.

EXAMPLE 1

A stainless steel autoclave was flushed with nitrogn and charged with 186 parts of dicyclopentadiene and 325 parts of vinyl chloride. The autoclave was then sealed, heated to a temperature of 190° C., maintained at this temperature for 3 hours, allowed to cool to room temperature and vented, and the unreacted vinyl chloride allowed to evaporate.

The contents of the autoclave were charged to a distillation apparatus and distilled through a 2 ft. silvered, vacuum jacketed column packed with glass helices. An initial fraction distilling at temperatures up to 50° C. at 15 mm. Hg pressure was discarded and two further fractions were collected; 70.5 parts of norbornenyl chloride distilling at 52° C. at 15 mm. Hg pressure and 40 parts of

distilling in the range 140° C. to 148° C. at 15 mm. Hg pressure. 13.5 parts of undistilled residue remained in the distillation flask.

If desired, the fraction containing norbornenyl chloride and

could have been combined and the mixture used in the further stages of the synthesis and the mixture of products so obtained used subsequently in copolymerisation with ethylene and an α-olefin. However, in this example the norbornenyl chloride was discarded.

A stainless steel autoclave was flushed with nitrogen and charged with 224 parts of

and 40 parts of isoprene. The autoclave was sealed, heated to a temperature of 170° C., maintained at this temperature for 3 hours and thereafter allowed to cool and the contents of the autoclave charged to a distillation apparatus and distilled through a 2 ft. silvered vacuum jacketed column packed with glass helices.

13 parts of an initial fraction distilling at temperatures up to 118° C. at 7 mm. Hg pressure was discarded and three further fractions were collected; 117 parts of unreacted

distilling at 118° C. to 135° C. at 7 mm. Hg pressure (mainly 125° C.), 30 parts of a fraction distilling at 135° C. to 162° C. at 7 mm. Hg pressure and 46.5 parts of

wherein one of the groups X and X' is hydrogen and the other is chlorine, distilling at 162 to 195 C. at 7 mm. Hg pressure (mainly 192° C.).

44 parts of

wherein one of the groups X and X' is hydrogen and the other is chlorine, were charged to a flask fitted with a stirrer and reflux condenser and were heated to a temperature of 200° C. 16 parts of potassium tertiary butoxide were gradually added to the flask over a period of 30 minutes. After the addition had been completed the contents of the flask were allowed to cool and were poured into water and extracted three times with ether. The ether extract was dried by standing over anhydrous sodium sulphate for 2 hours. The ether was then evaporated and the residue distilled through a 2 ft. long Vigreux column and 13 parts of the diene

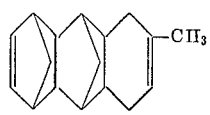

distilling in the range 160° C. to 190° C. at 8 mm. Hg pressure were collected and analysed and identified by nuclear magnetic resonance spectroscopy. The diene was used in copolymerisation with ethylene and propylene to produce a vulcanisable elastomer.

EXAMPLE 2

A stainless steel autoclave was flushed with nitrogen and charged with 578 parts of

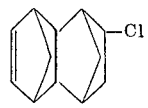

(prepared as described in Example 1) and 136 parts of isoprene. The autoclave was sealed, heated to a temperature of 170° C., maintained at this temperature for 3 hours and thereafter allowed to cool, and the contents of the flask charged to a distillation apparatus and distilled following the procedure described in Example 1. After removal of lower boiling fractions 201 parts of

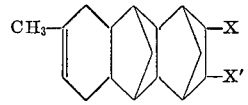

wherein one of the groups X and X' is hydrogen and the other is chlorine, distilling in the range 150° C. to 160° C. at 1 mm. Hg pressure, were collected.

3.45 parts of sodium and 118 parts of tertiary butanol were charged to a rocking autoclave which was then flushed with nitrogen, sealed and heated to a temperature of 150° C. for 3 hours. The autoclave was then allowed to cool and was vented and charged with 35 parts of

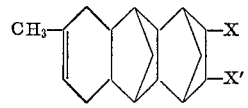

wherein one of the group X and X' is hydrogen and the other is chlorine. The autoclave was flushed with nitrogen, sealed and heated at a temperature of 200° C. for 2 hours. After allowing the autoclave to cool the contents were distilled through a 2 ft. long Vigreux column and 9.5 parts of

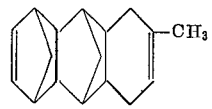

distilling in the range 98° C. to 103° C. at 1 mm. Hg pressure were collected.

EXAMPLE 3

The procedure described above in Example 2 was followed except that 129.7 parts of

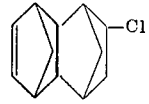

and 22.7 parts of piperylene (in place of the isoprene used in Example 2) were heated in an autoclave at a temperature of 190° C. for 3 hours and the contents of the autoclave were distilled and 30 parts of

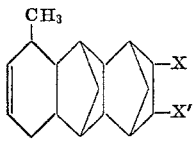

wherein one of X and X' is hydrogen and the other is chlorine, distilling in the range 145° C. to 150° C. at 1 mm. Hg pressure was collected.

3.45 parts of sodium and 118 parts of tertiary butanol were charged to an autoclave and heated as described in Example 2 and then 25 parts of

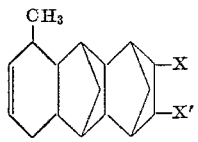

were charged to the autoclave, the contents of the autoclave were heated and distilled following the procedure described in Example 2, and 9.5 parts of the diene

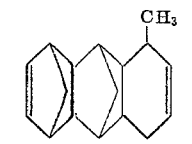

distilling in the range 98° C. to 103° C. at 1 mm. Hg pressure were collected and analysed and identified by nuclear magnetic resonance spectroscopy. The diene was used in copolymerisation with ethylene and propylene to produce a vulcanisable elastomer.

EXAMPLE 4

The procedure described above in Example 2 was followed except that 175 parts of

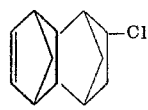

and 37 parts of dimethyl butadiene (in place of the isoprene used in Example 2) was heated in an autoclave at a temperature of 190° C. for 3 hours and the contents of the autoclave were distilled and 52.4 parts of

distilling in the range 165° C. to 170° C. at 1 mm. Hg pressure were collected.

3.45 parts of sodium and 118 parts of tertiary butanol were charged to an autoclave and heated as described in Example 2 and then 25 parts of

were charged to the autoclave, the contents of the autoclave were heated and distilled following the procedure described in Example 2, and 10.1 parts of the diene

distilling in the range 120° C. to 125° C. at 1 mm. Hg pressure were collected and analysed and identified by nuclear magnetic resonance spectroscopy. The diene was used in copolymerisation with ethylene and propylene to produce a vulcanisable elastomer.

What we claim is:

1. A compound selected from the group consisting of a polycyclic diene having the structure

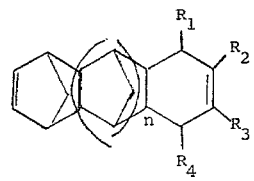

where $n$ is a whole number of at least one and $R_1$, $R_2$, $R_3$ and $R_4$ are selected from the group consisting of hydrogen atoms and monovalent hydrocarbyl groups, and derivatives thereof in which at least one of the carbon atoms of the endomethylene bridged rings not forming part of a carbon-carbon double bond carries a monovalent hydrocarbyl substituent group.

2. A polycyclic diene as claimed in claim 1 in which the carbon atoms of the endomethylene bridged rings are substituted.

3. A polycylic diene as claimed in claim 1 in which the groups $R_1$, $R_2$, $R_3$ and $R_4$ are selected from the group consisting of hydrogen atoms and alkyl groups.

4. A polycyclic diene as claimed in claim 1 in which $n$ is one.

5. A polycyclic diene as claimed in claim 1 in which one of $R_2$ and $R_3$ is an alkyl group and the other is a hydrogen atom, and $R_1$ and $R_4$ are hydrogenatoms.

6. A polycyclic diene as claimed in claim 1 in which $R_2$ and $R_3$ are alkyl groups and $R_1$ and $R_4$ are hydrogen atoms.

7. A polycyclic diene as claimed in claim 1 in which one of $R_1$ and $R_4$ is an alkyl group and the other is a hydrogen atom, and $R_2$ and $R_3$ are hydrogen atoms.

8. A polycyclic diene as claimed in claim 3 in which the alkyl group is methyl.

9. A polycyclic diene as claimed in claim 1 in which $R_1$, $R_2$, $R_3$ and $R_4$ are hydrogen atoms.

10. A mixture of polycyclic dienes consisting of
    (i) from 1% to 99% by weight of at least one polycyclic diene having the structure

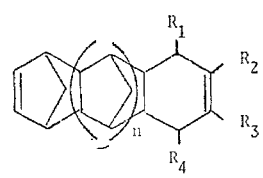

(I)

where $n$ is a whole number of at least one and $R_1$, $R_2$, $R_3$ and $R_4$ are selected from the group consisting of hydrogen atoms and monovalent hydrocarbyl groups, and (ii) from 99% to 1% by weight of a polycyclic diene of structure I in which $n$ is zero, or derivatives of said polycyclic dienes in which at least one of the carbon atoms of the endomethylene bridged ings not forming part of a carbon-carbon double bond carries a monovalent hydrocarbyl substituent group.

11. A mixture of polycyclic dienes as claimed in claim 10 in which the carbon atoms of the endomethylene bridged rings are unsubstituted.

(References on following page)

References Cited

UNITED STATES PATENTS

| | | | |
|---|---|---|---|
| 3,345,419 | 10/1967 | Tinsley | 260—617 |
| 2,952,710 | 9/1960 | Fields | 260—648 C |
| 3,144,491 | 8/1964 | O'Connor et al. | 260—666 PY |
| 3,356,688 | 12/1967 | Mark | 260—648 C |
| 3,565,962 | 2/1971 | Walmsley | 260—666 PY |

OTHER REFERENCES

Renner et al., Kunstoffe, 53, pp. 509–515, 1963.

Alder et al., Liebig Ann. Chem. Bd. 627, pp. 47–59, 1959.

DELBERT E. GANTZ, Primary Examiner

V. O'KEEFE, Assistant Examiner